United States Patent [19]
Watmough et al.

[11] Patent Number: 4,706,447
[45] Date of Patent: Nov. 17, 1987

[54] MACHINE FOR HARVESTING FRUIT AND THE LIKE FROM THE GROUND

[75] Inventors: Robert R. Watmough, Simcoe; David H. Timmins, Vanessa, both of Canada

[73] Assignee: Tobac Curing Systems Limited, Simcoe, Canada

[21] Appl. No.: 907,459

[22] Filed: Sep. 15, 1986

[51] Int. Cl.⁴ .......................................... A01D 51/00
[52] U.S. Cl. .............................................. 56/328 R
[58] Field of Search ..................... 56/328; 171/63, 65

[56] References Cited

U.S. PATENT DOCUMENTS

| | | | |
|---|---|---|---|
| 1,808,928 | 6/1931 | Lint | 56/328 R |
| 1,845,459 | 2/1932 | Ward | 171/101 |
| 2,599,715 | 6/1952 | Lepper | 56/328 |
| 2,760,322 | 8/1956 | Johnson | 171/97 |
| 3,491,367 | 1/1970 | Heyens | 171/115 |
| 3,667,200 | 6/1972 | Pool et al. | 56/328 |
| 3,693,331 | 9/1972 | Richter et al. | 56/328 R |
| 3,762,140 | 10/1973 | Block | 56/328 R |
| 3,777,462 | 12/1973 | Sharp et al. | 56/328 R |
| 3,879,923 | 4/1975 | Granger | 56/328 R |
| 3,914,925 | 10/1975 | McRobert | 56/328 |
| 4,077,194 | 3/1978 | Livingston | 56/328 R |
| 4,593,519 | 6/1986 | Kimball | 56/328 R |

OTHER PUBLICATIONS

"Fruit", Encyclopaedia Brittanica, 1949, vol. 9, pp. 877, 879.

"Weiss/McNair 936 P.T.O. Pick-Up Nut Harvester", Weiss/McNair Inc., Jan. 1984.
"The Flory 210 Tractor Powered Pick-Up Harvester", Flory Industries.

Primary Examiner—Paul J. Hirsch
Attorney, Agent, or Firm—Ridout & Maybee

[57] ABSTRACT

A machine for harvesting fruit from the ground comprises a frame and a transverse conveyor for engaging fruit on the ground and conveying the same transversely inwardly toward an inner end of the conveyor. An endless belt elevator is supported on the frame and includes a lower generally horizontal portion extending adjacent the ground adjacent the inner end of the transverse conveyor and positioned to receive the fruit and the like therefrom. The elevator passes upwardly at an obtuse angle with respect to the horizontal portion and over outer disc members engaging the belt and an inner roller member of diameter smaller than said discs and concentric therewith and having its surface conforming to the path of the upper ends of transverse flights on the belt. A receiving member extends transversely below an upper portion of the belt elevator beyond the upper roller for receiving fruit and the like passing over the roller. The receiving member inclines downwardly to one side of the belt elevator for guiding said fruit and the like toward a collection receptacle. The machine gathers the fruit, elevates it and transfers it to the collection receptacles while avoiding or reducing damage to the fruit.

17 Claims, 10 Drawing Figures

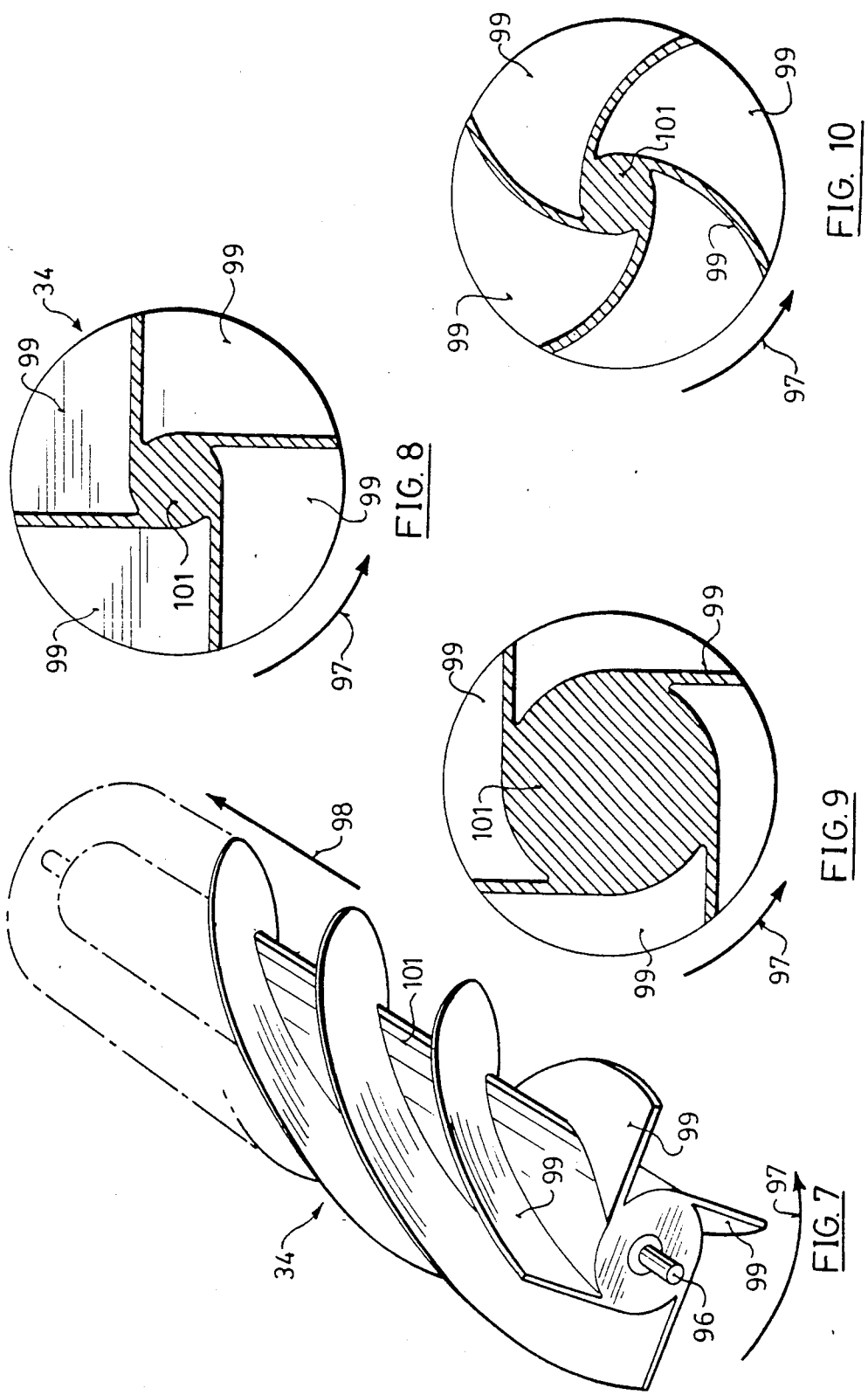

MACHINE FOR HARVESTING FRUIT AND THE LIKE FROM THE GROUND

The present invention relates to a machine for gathering fruit which has fallen to the ground naturally or has been intentionally shaken to the ground or cut down from trees or plants, and for depositing the gathered fruit in a collection receptacle or receptacles, without subjecting the fruit to impact or other forces likely to subject the fruit to an unacceptable extent of damage.

More particularly, the present invention relates to a machine for harvesting soft fruit and the like which is liable to be damaged if subjected to impact or abrasion. As examples of such soft fruit may be mentioned those classified as being of the pome structure belonging to the dry-fleshy type, namely apple, pear and quince, and those classified as being of the berry and hesperidium structures belonging to the fleshy type, namely tomato, and orange and lime (see, for example, the Classification of Fruit, p. 877, Encyclopaedia Brittanica, Vol. 9, 1949).

Applicant is aware of various prior machines employed for picking up hard items such as nuts or stones from the ground, but these known machines subject the items to impact and scraping forces which soft fruit would be incapable of withstanding without rupture, squashing or other damage resulting to an unacceptable extent.

The present invention provides a machine for harvesting fruit and the like from the ground comprising a frame movable forwardly over the ground, a transverse conveyor connected to the frame and disposed transversely of the forward direction of travel for engaging fruit and the like on the ground and conveying the same transversely inwardly toward a transversely-inward end of the conveyor, an endless belt elevator supported on the frame having upstanding transverse flights on its inner side and having a lower generally horizontal portion extending adjacent the ground adjacent the inward end of the transverse conveyor and positioned to receive fruit and the like therefrom on its inner side and passing upwardly at an obtuse angle with respect to said horizontal portion and over an upper roller rotating with the conveyor belt and comprising outer disc members engaging the belt and an inner roller member of diameter smaller than said discs and concentric therewith and having its surface conforming approximately to the path of the upper ends of the flights, and said belt elevator continuing from said upper roller in an upper portion of its run spaced above said lower horizontal portion downwardly toward said lower horizontal portion, and including a receiving member extending transversely below said upper portion of the belt elevator adjacent said upper roller for receiving fruit and the like passing over the roller, and inclining downwardly to one side of the belt elevator for guiding said fruit and the like toward a collection receptacle or receptacles.

With this arrangement, fruit and the like conveyed inwardly by the transverse conveyor needs to be raised only a short vertical distance in order to be received on the inner side of the endless belt elevator and therefore does not need to be subjected to strong impact forces in order to be raised onto the belt elevator. The elevation of the fruit on a belt provided with transverse flights and the passage of the belt around the inner roller rotating with the belt allows the fruit to be elevated and to be discharged from the elevator belt gently and without subjecting it to strong impacts or to scraping or shearing forces, such as are encountered if the elevator belt is in the form of a bucket conveyor or the like or passes around stationary guides.

Further advantages of machine of the invention and preferred features thereof are described below with reference to the accompanying drawings, which illustrate, by way of example only, one preferred form of machine in accordance with the invention, wherein:

FIG. 7 is a perspective view of one preferred form of transverse conveyor or auger for use in the present machine; and FIGS. 8 to 10 show end views of various other preferred forms of auger.

Figure 1:
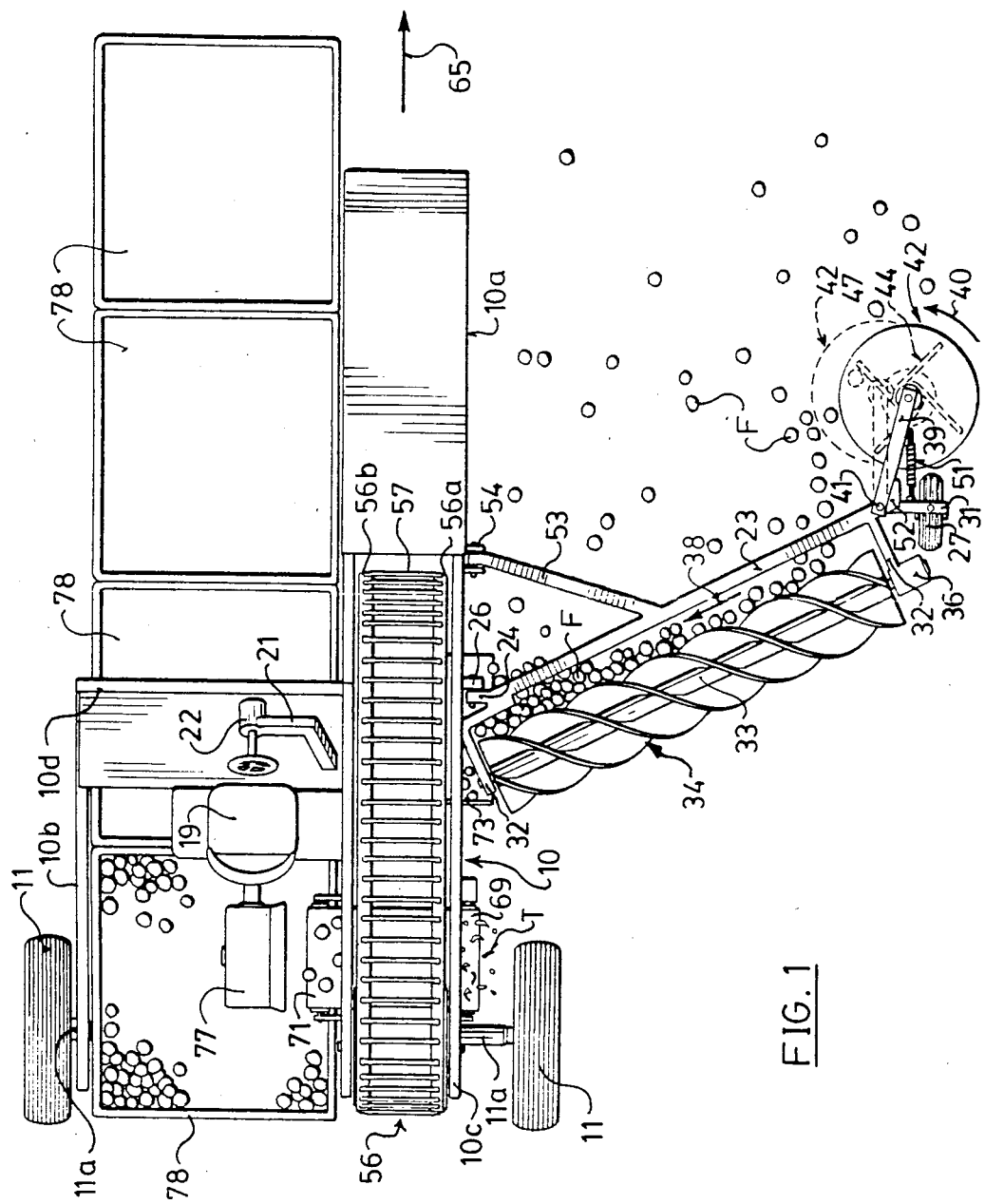
FIG. 1 shows a plan view of one form of machine in accordance with the invention.

Referring to the drawings, the machine comprises a generally rectangular frame 10 equipped at the rear with rear side wheels 11 each connected to an axle 12 connected to the underside of the frame 10. Generally, the frame consists of opposite side portions 10a and 10b, a raised superstructure 10c on the upper portion of the latter, and bridges 10d interconnecting the side portions 10a and 10b.

At the front, the portion 10a supports a single steerable front wheel 12 journalled on a vertical axis 13. The axis 13 has associated with it steering means comprising a crank and a retractable and extensible hydraulic piston-cylinder arrangement 14 anchored at the opposite end 16 to the frame, whereby extension and retraction of the piston 17 controls pivoting of the wheel 12 about the axis 13, and thus provides for steering of the vehicle.

The frame portion 10a supports an engine compartment housing a prime mover, e.g. an internal combustion engine coupled to the wheels of the machine through a transmission allowing forward and reverse driving. In the preferred form, the transmission drives and connects to the right rear wheel, which carries more weight than the left rear wheel, so that there is improved traction, and to the steerable front wheel 12. Driving of the steerable front wheel 12 improves the steerability of the machine. The engine also drives hydraulic pumps or the like which provide an hydraulic drive to the hydraulic piston-cylinder arrangement 14 and to other fluid powered motors on the machine described hereinafter in more detail.

At an approximately central portion of the upper frame portion or bridge 10d, a driver's seat 19 is supported. In the example shown, a console 21 adjacent the seat 19 is provided with a steering wheel 22, rotation of which operates valving arrangements controlling flows of hydraulic fluid to the piston-cylinder arrangement 14, and hence controlling the steering of the steering wheel 12. Adjacent the console 21 may be other conventional controls, such as foot pedals, levers and the like (not shown) controlling the the various driven portions of the machine.

A boom 23 extends transversely and slightly forwardly outwardly from the outer side of the frame side portion 10a at a point rearwardly from the steerable wheel 12. The boom is connected for pivoting in a vertical plane about a horizontal pivot pin 24 connecting its inner end pivotably to a short strut 26 connected rigidly to the frame 10. The opposite end of the boom 23 is supported by a small caster wheel or ground wheel 27 having its axis 28 journalled in a frame 29 journalled at its upper end to a transversely extending bar 31 connected to the boom 23.

Extending rearwardly from each end of the boom 23 is a support 32 on which is journalled a transverse conveyor in the form of a horizontal shaft 33 supporting an auger 34, preferably a four flight auger. On the outboard support 32 a rotary motor 36 is supported, powered by the above-mentioned hydraulic drive, and connected to the shaft 33 so as to rotate the auger 34 in the sense impelling items engaged by the auger in the transversely inward direction indicated by the arrows 38 in FIG. 1. The auger 34 turns in free space, i.e. it is not contained or partially contained in a part cylindrical trough, tube or other containment device at its rear or at its upper side. This further avoids or reduces subjecting the fruit to shear forces.

A support arm 39 is pivoted on the outboard end of the boom 23 on a vertical pivot axis 41. The arm 39 supports a sweeper device 42 comprising a rotary motor 43 connected to the underside of the arm 39, and driven in the direction indicated by the arrow 40 by the hydraulic system described above. A series of sweeper members, preferably planar or sheet material paddles 44, each extend in a vertical plane and are connected to a vertical shaft of the sweeper 42 connected to the motor 43 so that the paddles are rotated in the sense to engage and sweep inwardly, into the path swept by the auger 34, fruit normally lying outwardly from the outer end thereof. Preferably, the paddles 44 extend tangentially with respect to the shaft in the direction opposite to the direction of rotation of the shaft. As a result, the paddles strike the fruit obliquely, tend to impel the fruit in a direction somewhat radially outwardly from the shaft toward a quadrant lying forwardly and inwardly of the shaft, and subject the fruit to less damage than results with radially directed paddles or with paddles extending tangentially in the direction of rotation, further, this arrangement reduces or avoids the tendency for the sweeper 42 to cast fruit rearwardly outwardly away from the path swept by the auger, as a result of a paddle entraining the fruit for a half rotation of the paddle or move. A small disc of metal or some other wear-resistant material is connected to the free end of the shaft of the sweeper 42 a small distance below the lower edges of the paddles 44 so that, when the disc 46 engages the ground, there is a small clearance, e.g. about one half inch, between the lower edges of the paddles 44 and the surface of the ground. Preferably, the paddles 44 are of a resiliently flexible sheet material, for example sheet rubber.

A relatively large rigid disc 47 is supported on the shaft of the sweeper 42 adjacent the upper sides of the paddles. The perimeter of the disc 47 is covered with a bumper strip 48 of resiliently deformable material, e.g. rubber. The strip 48 preferably projects slightly laterally relative to the ends of the paddles 44. Normally, biasing means, for example a tension spring 51 connected between the outer end of the arm 39 and the boom 38, bias the arm 39 together with the sweeper device 42 outwardly to an outer position shown in broken lines in FIG. 1, wherein one side of the arm 39 engages on a triangular stop 52 connected on the outer end of the boom 23. In the outer position, the paddles 44 of the sweeper 42 extend beyond the outer end of the auger 34. The pivoted support of the sweeper device 42 permits sweeping of fruit and other items from the ground up to and around fixed obstacles such as tree trunks lying in the path of the sweeper device 42, it being only necessary for the driver to steer the vehicle so that the outermost end of the members fixed rigidly to the boom, for example the support arm 31, clear the tree trunks or other obstacles. As the sweeper 42 approaches a tree trunk or the like, and the bumper strip 48 strikes the tree trunk or other obstruction, the reaction with the obstruction pivots the sweeper 42 inwardly, for example to the position shown in broken lines in FIG. 1, against the action of the spring 51, so that the sweeper member sweeps around the perimeter of the obstruction. When the sweeper 42 clears the obstruction, the force of the spring 51 pivots it back to its normal position, as shown in solid lines in FIG. 1.

By having the boom 23 and auger 34 mounted on a pivot 24 and supported at the outboard end on a caster wheel 27, the auger 34 is free to rotate upwardly and downwardly in a vertical plane about the horizontal pivot 24, thus allowing the auger to ride upwardly and downwardly in order to accommodate irregularities in the surface of the ground. The boom and auger 34 can also be lifted to a vertical position thus reducing the overall width of the machine for road travel. In order to assist in maintaining the boom 23 and auger 34 in use in their horizontally forwardly outwardly inclined position relative to the frame 10, against the action of rearwardly directed forces acting on them, a link, for example a strut 53 may be coupled between the boom 23 and the frame portion 10a, this strut 53 normally being in tension during operation of the machine. Such strut 53 may be articulated to the frame 10 through a pivot pin 54 coaxial with the pivot pin 24, thus permitting the boom and strut 53 to rotate upwardly and downwardly relative to the frame 10 about a common axis.

The rotation of the auger 34, as noted above, impels fruit F on the ground engaged by it, or brought into its line of action by the sweeper device 42, toward the laterally inner end of the auger, adjacent the frame side portion 10a. In the preferred form, the operator can control the speed of rotation of the auger independently of or relative to the speed of forward travel of the machine, so that in case of, for example, harvesting fruit lying densely on the ground, the speed of the auger can be increased so that its conveying capacity is not overwhelmed.

Figure 2:
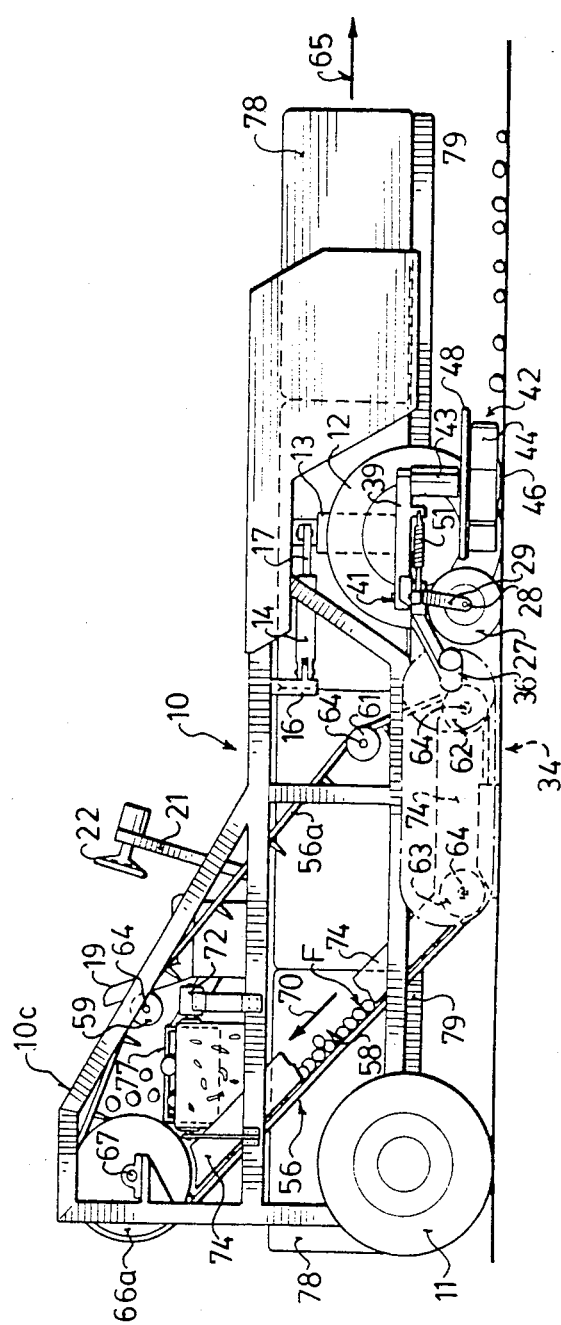
FIG. 2 shows partially schematically a partially fragmentary side view of the machine of FIG. 1.
Figure 5:
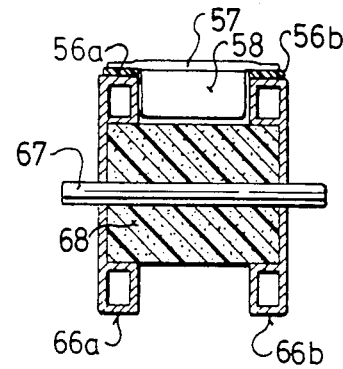
FIG. 5 shows a cross-section taken on the line 5—5 in FIG. 4.

An endless belt elevator 56 is supported on the side portion 10a and extends upwardly into and is supported by the superstructure 10c. The elevator consists of two endless belt portions 56a and 56b preferably of resiliently flexible material, for example of reinforced plastic polymer such as PVK, spaced apart and interconnected by a series of transversely extending rigid rods 57 spaced apart at uniform small intervals longitudinally, and anchored at each end on the outer sides of the belts. The spacing between the rods 57 is insufficient for fruit to pass between adjacent rods. At larger regular intervals, e.g. distances apart of several inches, a flight or inwardly projecting rib 58 is attached to a rod 57. Desirably each flight 58 is of stiffly flexible sheet material, e.g. of stiffly reinforced polymer, has its edges spaced inwardly from the sides of the belts 56a and 56b, as seen in FIG. 5, and offers sufficient rigidity through its own stiffness and through its connection to the rod 57 and the latter's anchoring to the belts 56a and 56b that it can withstand a substantial loading applied to it longitudinally of the belt 56 without marked deflection. Thus, the flights 58 provide the belt 56 with pockets which can receive the fruit F and can retain it and convey it upwardly and rearwardly on the inner side of the belt, as seen in FIG. 2 without the flights 58 deflecting and allowing fruit to fall downwardly.

Figure 4:
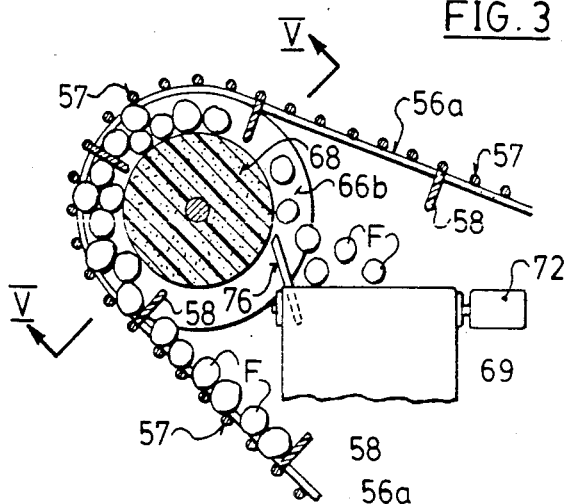
FIG. 4 shows a side view, partially in section, of an upper portion of the elevator belt and of the upper roller of the machine.

The belt 56 runs around disc-like rollers arranged in pairs which engage the belt portions 56a and 56b at the edges of the belt, respectively, and which guide the movement of the belt. Such pairs of disc-like rollers, which are supported and journalled on the frame portion 10a and superstructure 10c, on laterally outwardly extending stub axles 64, so that they do not interfere with the flights 58, comprise two pairs of upper rollers 59 and 61, and two pairs of lower rollers 62 and 63 defining between them a lower horizontal run of the belt 56. An upper pair of disc members or rollers 66a and 66b of relatively large diameter, are connected on an axle 67 journalled on the superstructure 10c. One or more of the pairs of axles 64 supporting the small rollers is biased outwardly, for example by tension springs acting between them and the frame 10, so that a tension is maintained in the belt 56. One of the pairs of rollers, advantageously the pair of large rollers 66a and 66b, is driven by a rotary hydraulic motor so that the belt is driven in the direction shown by the arrow in FIG. 2. The axle 67 and the rollers 66a and 66b have a soft cylindrical inner roller member or body 68 connected to them, the body 68 being of readily compressible material such as foam plastic or foam rubber. The body 68 is of reduced diameter as compared with the rollers 66a and 66b so that, as seen in FIG. 4, the surface of the body 68 approximately conforms to the path swept out by the inner ends of the flights 58 as they travel with the belt 56 around the rollers 66a and 66b.

The surface of the body 68 thus seals the pockets formed between adjacent pairs of the flights where these travel upwardly around the large rollers 66a and 66b.

Forwardly of the rollers 66a and 66b and below the upper run of the belt 56 where it passes to an upper pair of rollers 59, a receiving member in the form of an endless belt 69 extends transversely around a lower idler roller 71, supported rotatably on the frame 10 on the side of the superstructure 10c adjacent the upper bridge 10d, and an upper roller connected to an hydraulic rotary motor supported on the frame 10. The motor 72 drives the belt 69 so that its upper run travels upwardly outwardly from the side adjacent the bridge 10d to the side adjacent the boom 23 and auger 34. The belt 69 is preferably of a continuous resilient sheet material, e.g. rubberized fabric so that it will somewhat cushion the fall of fruit onto it and presents a continuous surface which does not tend to trap or retain trash such as twigs, leaves, etc.

In operation, fruit F lying on the ground in the path of the vertical shafted sweeper 42 is swept inwardly toward the path of the horizontal conveyor or auger 34 as the frame 10 of the machine is propelled forwardly over the ground in the direction of the arrow 65 in FIG. 1. The fruit F swept into or lying in the path of the auger 34 is conveyed by the flights of the auger inwardly toward the lower generally horizontal portion of the endless belt elevator 56 extending between the two lower pairs of rollers 62 and 63. These are disposed so that the said horizontal portion of the run of the belt 56 is only a few inches above the ground and is arranged to receive on its upper or inner surface the fruit conveyed to the inward end of the auger 34. For example, the extreme inner end of the flights of the auger 34 may be of reduced diameter and may enter slightly the space above the edge portion 56a of the horizontal portion of the belt 56, the latter being disposed such a small distance above the ground surface that the impact of the fruit F against the edge of the belt 56a causes it to be deflected upwardly onto the inner or upper side of the belt 56.

In the preferred form, a ramp member 73 is connected to the underside of the frame portion 10a adjacent the inner end of the auger 34. The ramp member 73 may take the form of a rectangular plate that inclines upwardly from a lower edge parallel to the normal direction of travel of the machine and disposed at approximately ground level to an upper parallel edge adjacent to or slightly inwardly of the outer edge of the belt portion 56a. The upper surface of the member 73 thus provides a ramp surface up which the fruit will slide or roll because of the inwardly directed forces applied by the auger 34 to the closely packed rows of fruit which the auger assembles adjacent its inner end. The upper side of the belt will typically be no more than about 3 inches above the ground and therefore relatively small pressures or forces applied to the fruit are adequate to cause it to travel up the surface of the ramp member 73. The fruit F passing from the ramp member onto the upper or inner surface of the belt 56 is collected in the pockets formed between adjacent pairs of the flights 58 and conveyed upwardly, in the direction of the arrow 70 in FIG. 2, toward the upper pairs of large rollers 66a and 66b. As seen in FIG. 2, in the preferred form, fixed retainer plates 74 extending in a vertical plane may be supported on the frame 10 on the side of the horizontal portion of the belt 56 opposite the ramp member 73 and on eacn side of the belt in the upwardly inclining portion which extends at an obtuse angle to the horizontal portion between the rear pair of lower rollers 63 and the upper large rollers 66a and 66b, in order to retain fruit F from falling laterally out of the sides of the pockets between the adjacent flights 58.

As the belt 56 passes around the body 68, fruit contained in the pockets transfers its weight from the belt 56 to the body 68. In the event that the fruit gathered is distributed rather sparsely on the ground and the pockets between the flights 58 and the belt 56 are not full, the fruit will tend to fall downwardly a short distance onto the body 68. However as this is compressible foam or the like it cushions the fall of the fruit and prevents excessive bruising or squashing of the fruit. Moreover, in the preferred form the control means accessible to the operator include means for controlling the speed of the belt 56 as well as the speed of the auger 34, independently of or relative to the speed of forward travel of the machine, so that by slowing down the belt 56, if necessary, the fruit may fill the pockets between the flights so that the upper surfaces of the fruit piled in the pockets may be adjacent or above the upper ends of the flights 58. In such case, as the belt 56 approaches the roller body 68 the foam or other compressible body 68 is compressed by its reaction with the fruit, so that the fruit is held in snug compression as it passes over the roller. The transition of the movement of the fruit F from upward rearward movement to forward and downward movement as it passes over the roller body 68 may also be accomplished gently with a modified arrangement wherein the body 68 is incompressible or rigid. However, for the reasons discussed above, improved handling, with substantially less imposition on the fruit of forces liable to cause rupture, squashing, or other damage, can be achieved using a body 68 of readily compressible material.

Figure 3:
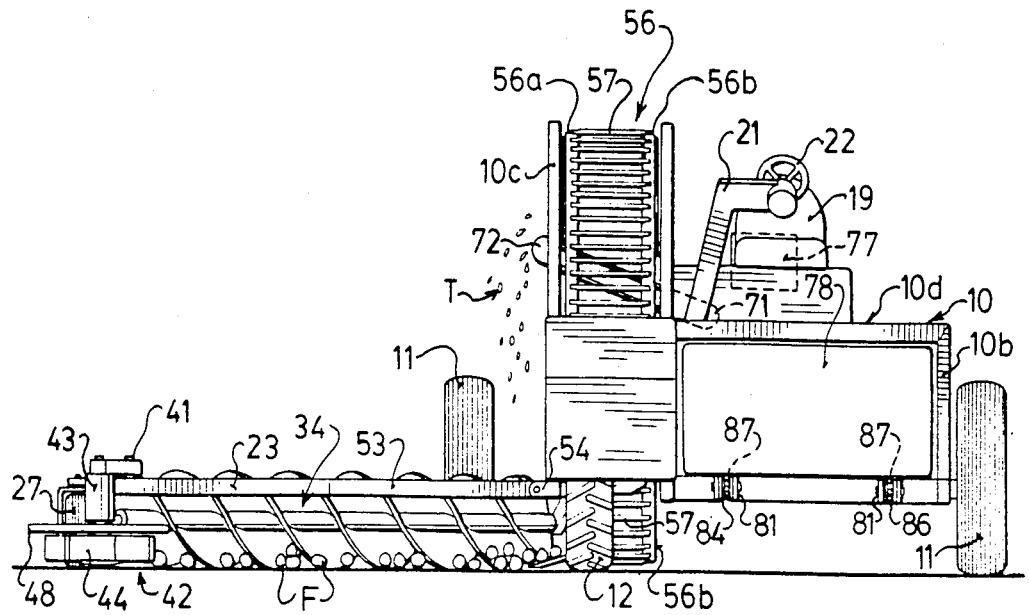
FIG. 3 shows a front view of the machine.

From the body 68 the fruit falls onto the upper inclining side of the belt 69. It is found that the fall from the body onto the belt 69 does not cause excessive damage to the fruit. If necessary or desired, a generally triangular plate 76 seen in end view in FIG. 4 may be supported on the frame 10 between the body 68 and the belt 69 to prevent fruit from falling rearwardly from the upper side of the belt 69. The belt 69 is driven at a speed which is sufficient to entrain light trash T such as leaves, grass, twigs, etc. so that these are carried upwardly on the belt and are ejected laterally from the inner side of the superstructure 10c, as seen in FIG. 3. To assist in separating the trash T, an air blower 77 is preferably supported on the bridge portion 10d of the frame to blow a current of air longitudinally of the belt 69 in the direction of its upward inclination, so that the lighter trash materials tend to be entrained in the air current and blown outwardly and thus separated from the fruit. The angle of inclination of the belt 69 is arranged sufficiently steeply that the fruit rolls or slides down the belt in the direction counter to the movement of the belt, to be received by collection means.

While it would be possible to collect the fruit in wheeled containers forming part of a separate vehicle or towed by the machine or by a separate vehicle, in the preferred form the fruit is collected in collection receptacles supported on the machine.

Figure 6:
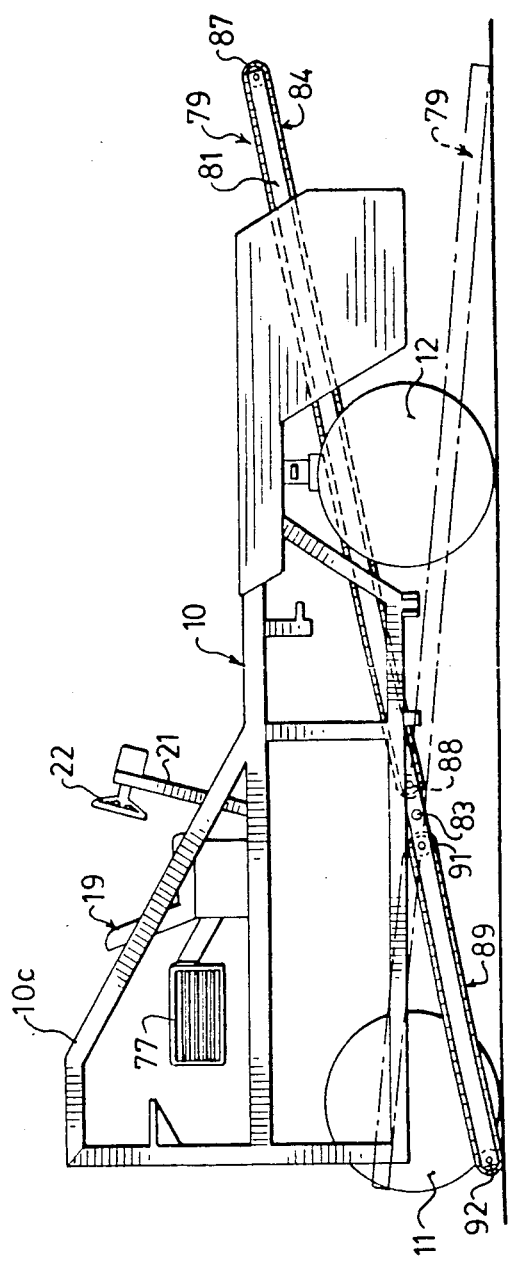
FIG. 6 shows a partially schematic side view corresponding to FIG. 2.

In the example illustrated, the receptacles are square or rectangular boxes 78, a row of which is supported on a conveyor so that the boxes can be conveyed progressively longitudinally rearwardly on the machine. The conveyor and support for the boxes comprises a generally rectangular channel which is open at each end and at the top. The sides of the channel are formed by the inner sides of the frame portions 10a and 10b, while the mainly open bottom is formed by a rectangular frame 79 comprising longitudinal and transverse support members 81 and 82, respectively. The frame 79 is pivotally connected to the frame 10 for pivoting about a horizontal axis 83, which in the preferred form is spaced forwardly from the rear end of the conveyor and support a distance about one and a half times the length of the boxes 78. An extendible and retractable hydraulic piston and cylinder arrangement is articulated between the frames 10 and 79 so that the frame can be pivoted from the horizontal position shown in FIG. 2 to upwardly and downwardly forwardly inclined positions shown in solid and in broken lines respectively, in FIG. 6.

In the preferred form, separate fruit and rear conveyors are mounted on the frame 79. The front conveyor comprises a pair of transversely spaced endless chains 84 and 86 each extending parallel to the longitudinal members around at least front and rear sprockets 87 and 88, respectively, the rear sprockets 88 being adjacent the pivoted axis 83. A similar transversely spaced pair of chain conveyors 89 extend around sprockets 91 and 92 from adjacent the axis 83 to the rear end of the frame 79. The chains 84, 86 and 89 are guided so that their upper flights extend above the upper sides of the longitudinal members 81, and the chains frictionally engage on the lower sides of the boxes 78.

In use, as shown, normally a number of boxes 78 are maintained on the machine, the rearmost box being adjacent the lower end of the belt 69 and receiving the fruit therefrom. When the rearmost box is full, the frame 79 can be pivoted downwardly rearwardly to the position shown in solid lines in FIG. 6, wherein the rear ends of the members 81 are adjacent the ground, and the conveyors 84, 86 and 89 operated to propel the full box rearwardly and downwardly to be deposited gently on the ground as the machine is moving formally. The next empty box, occupying an intermediate position forwardly of the belt 69, is brought by the movement of the conveyors to the position adjacent the belt 69 at which it will commence receiving the harvested fruit. All the boxes on the machine are thus moved rearwardly one box length so that the forward end of the conveyors 84 and 86 is ready to pick up a fresh box. Desirably, the front conveyors 84 and 86 can be activated independently of the rear conveyors 89 so that, with the machine moving forwardly and continuing the harvesting of the fruit from the ground, the frame 79 can be inclined downwardly forwardly as shown in broken lines in FIG. 6, wherein the front ends of the members 81 are adjacent the ground, and the fruit conveyors 84 and 86 operated to engage and pick up an empty box from the ground and convey it to the said intermediate position without disturbing the rearmost box which is receiving fruit from the belt 69. Desirably however, the drive to the rear conveyors 89 is interlinked to the drive to the front conveyors 84 and 86 so that the rear conveyors 89 cannot be operated to propel a box rearwardly without the front conveyors 84 and 86 being operated to move an empty box rearwardly so that it will take up a fruit-receiving position adjacent the belt 69.

FIG. 7 shows one preferred form of auger 34 for use in the present invention comprising an axle 96 coaxial with the longitudinal axis of the auger, and to which the motor 36 may be connected to rotate the auger in the direction indicated by the arrow 97 so that fruit engaged by the auger is driven along the ground in the direction indicated by the arrow 98. The auger has multiple helical flights 99 (four in the example shown) so that in front elevation there are only small notches or recesses between the auger and the surface of the ground, and the auger presents a substantially continuous cylindrical profile, thus allowing the fruit to be conveyed without requiring a trough or other containment device associated with the auger.

Desirably, in cross section the flights 99 extend tangentially with respect to the axis of the auger 34, in the direction opposite to the direction of rotation 97 of the auger, as seen in FIG. 7. As a result, the flights engage the fruit obliquely in planes perpendicular to the axis of the auger 34. As with the tangential paddles 44 on the sweeper device 42, this reduces the force applied to the fruit by the flights 99 as compared with flights which extend radially or tangentially in the direction of rotation, urges the fruit somewhat radially outwardly from the axis of the auger and avoids or reduces the tendency for fruit to be carried upward and over the axis of the auger for a half rotation or more of the auger, so that with the preferred arrangement fruit is collected and does not tend to be deposited rearwardly of the auger 34. The generally cylindrical support 101 or origin of the flights 99 may be of smaller or larger diameter as shown in FIGS. 8 or 9, respectively, wherein the diameter of the circle to which the flights are tangential is less than half and more than half, respectively, the diameter of the auger 34. The diameter will be selected according to the circumstances of use of the machine, in order to achieve satisfactory longitudinal conveying of the fruit with the least amount of damage to the fruit. For convenience of construction of the auger 34, desirably the flights 99 curve outwardly in cross section toward the direction opposite the direction of rotation of the auger, as seen in FIG. 10.

We claim:

1. Machine for harvesting fruit and the like from the ground comprising a frame moveable forwardly over the ground, a transverse conveyor connected to the frame and disposed transversely of the forward direction of travel for engaging fruit and the like on the ground and conveying the same transversely inwardly toward a transversely-inward end of the conveyor, an endless belt elevator supported on the frame having upstanding transverse flights on its inner side and having a lower generally horizontal portion extending adjacent the ground adjacent the inward end of the transverse conveyor and positioned to receive fruit and the like therefrom on its inner side and passing upwardly at an obtuse angle with respect to said horizontal portion and over an upper roller rotating with the conveyor belt and comprising outer disc members engaging the belt and an inner roller member of diameter smaller than said discs and concentric therewith and having its surface conforming approximately to the path of the upper ends of the flights, and said belt elevator continuing from said upper roller in an upper portion of its run spaced above said lower horizontal portion, and downwardly toward said lower horizontal portion, and including a receiving member extending transversely below said upper portion of the belt elevator adjacent said upper roller for receiving fruit and the like passing over the roller, and inclining downwardly to one side of the belt elevator for guiding said fruit and the like toward a collection receptacle.

2. Machine as claimed in claim 1 wherein the inner roller member comprises a readily compressible material engaging the fruit and the like carried over the upper roller.

3. Machine as claimed in claim 2 wherein said inner roller member is of a material selected from the group consisting of a soft rubber and plastic foam.

4. Machine as claimed in claim 1 wherein said receiving member comprises an endless receiving belt extending on each side of the belt elevator, and means driving the belt so that its upper run moves upwardly and outwardly, for carrying trash in an upward and outward direction counter to the downward movement of the fruit and the like.

5. Machine as claimed in claim 4 including a blower having an outlet blowing outwardly over the upper surface of the receiving belt.

6. Machine as claimed in claim 1 wherein the frame defines a channel-shaped support for generally rectangular collection receptacles, said channel-shaped support extending from an opening at the front of the machine and under the receiving member to an opening at the rear of the machine, and said support being provided with receptacle conveying means for conveying receptacles from said front opening along said support toward said opening at the rear.

7. Machine as claimed in claim 6 wherein said support comprises longitudinal members forming a bottom of said channel and being pivotable between forwardly upwardly and downwardly inclining positions wherein the rear and the front ends of said longitudinal members are adjacent the ground, respectively.

8. Machine as claimed in claim 6 wherein said conveying means comprise front and rear conveying means for conveying the receptacles from the front to an intermediate portion of the support adjacent said receiving member and from said intermediate portion to the rear, respectively, and the front conveying means is operable independently of the rear conveying means.

9. Machine is claimed in claim 8 wherein the rear conveying means is interlinked with and operates together with the front conveying means.

10. Machine as claimed in claim 1 comprising a sweeper with a vertical driven shaft supported so as to be pivotable between an outer position disposed outwardly from the outer end of the transverse conveyor and an inner position disposed inwardly adjacent said outer end, the sweeper comprising sweeper members connected to said shaft and extending in vertical planes generally outwardly from the shaft, for sweeping fruit and the like inwardly from positions beyond the outer end of the transverse conveyor.

11. Machine as claimed in claim 10 including means for driving said shaft in one direction of rotation and wherein said sweeper members extend tangential to said shaft in the direction opposite to the direction of rotation of the shaft.

12. Machine as claimed in claim 10 wherein said sweeper members are sheet form paddles.

13. Machine as claimed in claim 1 comprising a ramp connected to the frame and having a ramp surface extending from a lower end adjacent the inward end of the transverse conveyor upwardly and transversely inwardly to an upper end spaced upwardly a short vertical distance from said lower end and adjacent the upper side of said horizontal portion of the belt elevator.

14. Machine as claimed in claim 1 wherein said transverse conveyor comprises a multiple flight auger having an axis and means for rotating the auger about its axis in a direction tending to move fruit contacted by the auger toward said transversely inner end.

15. Machine as claimed in claim 14 wherein said auger comprises flights which extend generally tangentially with respect to said axis in the direction opposite to said direction of rotation.

16. Machine as claimed in claim 15 wherein said flights curve outwardly in cross-section toward the direction opposite to said direction of rotation.

17. Machine as claimed in claim 14 wherein the auger rotates in free space.

* * * * *